(12) United States Patent
Lachartre

(10) Patent No.: US 7,929,641 B2
(45) Date of Patent: Apr. 19, 2011

(54) SIGNALS RECEPTION CHAIN

(75) Inventor: David Lachartre, Montbonnot (FR)

(73) Assignee: Commissariat A l'Energie Atomique, Paris (FR)

( * ) Notice: Subject to any disclaimer, the term of this patent is extended or adjusted under 35 U.S.C. 154(b) by 928 days.

(21) Appl. No.: 11/619,353

(22) Filed: Jan. 3, 2007

(65) Prior Publication Data

US 2007/0165756 A1 Jul. 19, 2007

(30) Foreign Application Priority Data

Jan. 19, 2006 (FR) ..................................... 06 50188

(51) Int. Cl.
*H04L 27/00* (2006.01)
*H03K 9/00* (2006.01)
(52) U.S. Cl. ......... 375/316; 375/324; 375/332; 375/340
(58) Field of Classification Search .................. 375/316, 375/324, 332, 340
See application file for complete search history.

(56) References Cited

U.S. PATENT DOCUMENTS

| | | | | |
|---|---|---|---|---|
| 5,663,733 | A * | 9/1997 | Lennen | 342/357.12 |
| 7,389,091 | B2 * | 6/2008 | Tanaka | 455/126 |
| 7,460,622 | B2 * | 12/2008 | Baker et al. | 375/343 |
| 7,515,627 | B2 * | 4/2009 | Liu et al. | 375/133 |

OTHER PUBLICATIONS

Lucian Stoica, et al., "An Ultrawideband System Architecture for Tag Based Wireless Sensor Networks", IEEE Transactions on Vehicular Technology, vol. 54, No. 5, Sep. 2005, pp. 1632-1645.
Barrie Gilbert, "A Precise Four-Quadrant Multiplier with Subnanosecond Response", IEEE Journal of Solid-State Circuits, vol. SC-3, No. 4, Dec. 1968, pp. 365-373.
Behzad. Razavi, RF Microelectronics, 1998, pp. 122-164.
Didier Helal, et al., "STMicroelectronics Proposal for IEEE 802.15. 3a Alternate PHY", IEEE P802.15 Working Group for Wireless Personal Area Networks (WPANs), Mar. 3, 2003, Slides 1-48.
Didier Helal, et al., "STMicroelectronics Proposal for IEEE 802.15. 3a Alternate PHY", IEEE P802.15 Working Group for Wireless Personal Area Networks (WPANs) Jul. 14, 2003, Slides 1-96.
Yi-Ling Chao, et al., "Optimal and Suboptimal Receivers for Ultrawideband Transmitted Reference Systems", IEEE GLOBECOM, 2003, pp. 759-763.
Jae-Joon Kim, et al., "Independent-Gate Controlled Asymmetrical SRAM Cells in Double-Gate MOSFET Technology for Improved READ Stability", ESSDERC Solid-State Device Research Conference, Sep. 2006, pp. 73-76.

* cited by examiner

*Primary Examiner* — Ted M Wang
(74) *Attorney, Agent, or Firm* — Oblon, Spivak, McClelland, Maier & Neustadt, L.L.P.

(57) ABSTRACT

A signals reception chain including: an input interface receiving a signal and transforming the received signal into at least two signals correlated in phase or in opposite phase, each of the correlated signals being distributed on at least one channel, the channels being identical, at least one analog-digital converter that operates on 1 bit of the signals in phase or in opposite phase, on each of the channels, and a digital processor for processing the converted signals stemmed from the channels, and performing operations between the converted signals in phase or in opposite phase.

35 Claims, 6 Drawing Sheets

SIGNALS RECEPTION CHAIN

FIELD OF THE INVENTION

The invention relates to the field of data reception. Transmitted data may be in the form of radiofrequency waves or in the form of electrical or optical waves. The invention is particularly useful in the case of pulse type Ultra-WideBand (UWB) wave shapes. The invention may also apply to systems using narrow band or non-pulse UWB wave shapes and for positioning systems or radar applications.

BACKGROUND OF THE INVENTION

A very large number of signal reception architectures are available in the current state of the art for reception of radiofrequency signals. The book <<RF Microelectronics>> by B. RAZAVI describes several types of these architectures.

At the moment, there is a strong demand for the development of simplified reception architectures with low consumption. The purpose is to provide solutions for so-called low speed transmission systems with severe consumption and cost constraints. However, these simplified architectures must be capable of receiving very low amplitude signals particularly so as to obtain an attractive range on wireless transmission systems.

In the special case of pulse UWB systems, new architectures have recently been proposed by work groups: <<Proposals for IEEE 802.15.4a Alternate PHY>>. These architectures are different essentially due to the processing applied to signals in the reception chain and their implementation on silicon. These architectures may be classified into several categories.

So-called <<transmitted reference>> architectures are based on successive emission of a reference pulse and a pulse coding the data to be transmitted. Therefore, the receiver must be capable of making a correlation between the delayed reference pulse and the pulse coding the data to be transmitted. This type of receiver requires integration of a delay cell. In the case of an analog version, the implementation of this delay cell and the correlation cell is relatively complex due to the required precision and the gain control at the input that must be done. In the case of a digital version, processing of the delay and of signals correlation is simplified but management of high speed digital data may prove to be difficult and increase consumption.

Architectures based on the voltage peaks detection or on the detection of fronts are very simple to implement. However, they have limited performances in terms of range because it is difficult to make coherent integrations, in other words to take the average of several received synchronous pulses so as to reduce noise, to increase the signal to noise ratio of the received signals.

Architectures based on a frequency change are attractive because they make it possible to perform a number of processings at lower frequencies. However, they require the integration of a frequency synthesis circuit operating at very high frequency and the gain control at the mixer input is complex.

Energy detection architectures represent an attractive alternative because the implementation scheme is relatively simple. They make it possible to capture all energy present at reception and are compatible with a coherent integration. However, the implementation of these detection circuits in classical silicon technologies is very difficult. The dynamic range obtained on these circuits is usually low. The structure can be made more complex to improve the dynamic range of the energy detector, but at the detriment of frequency performances. The consumption is then higher and the constraint on the gain control circuit is severe.

A simplified receiver architecture was recently proposed in publication <<STMicroelectronics proposal for IEEE 802.15.3a Alternate PHY>> by D. Helal et al. It is based on the principle of 1 bit digitization of the received signal at very high frequency (20 GHz). The design of the first RF stage is simplified, as are gain control constraints. However, considering the high data speed, the complexity and therefore the consumption of the digital part associated with this receiver are high. It is also necessary to make a precise synchronization between the transmitter and the receiver and a good estimate of wave propagation. The digitization frequency of the system can be reduced by sub-sampling the signal but digital processing is still important.

SUMMARY OF THE INVENTION

The purpose of this invention is to propose a signals reception architecture with low consumption, For which implementation remains simple and that provides a solution to dynamic range problems of energy detection cells and also to gain control problems.

To achieve this purpose, this invention proposes a signals reception chain comprising:
- an input interface receiving a signal and transforming the received signal into at least two signals correlated in phase or in opposite phase, each of the correlated signals being distributed on at least one channel,
- analog-digital conversion means, or at least one analog-digital converter, on at least 1 bit of the correlated signals, on each of the channels,
- digital processing means of the converted signals comprising at least means of performing operations between said converted signals.

Thus, the analog part of this reception chain is reduced to the simple reception function, and its implementation is simplified accordingly.

Furthermore, energy detection dynamic problems are simplified, particularly when the reception chain comprises an analog-digital conversion on 1 bit with two correlated signals.

The signals reception chain may also comprise amplification means, or at least one amplifier, for example arranged between the input interface and the analog-digital conversion means.

The amplification means, or the amplifier, may make a linear or non-linear amplification, such as amplification with saturation. Thus, there is no need for a gain control.

The amplification means, or the amplifier, may have a constant gain.

Means of performing operations between said signals may comprise multiplication means, or at least one multiplier.

The multiplication means, or the multiplier, may then comprise at least one exclusive OR gate when the received signal is transformed into two correlated signals and when the conversion is done on 1 bit.

In this case, the output from the exclusive OR gate may be an inverter output when the two correlated signals are in phase, thus making an exclusive NOR gate.

Operation means may comprise means of adding, or at least one adder, of the converted signals when said converted signals are in phase. Thus, noise is reduced without modifying the initially received signal.

When said converted signals are in opposite phase, the operation means may comprise means of subtraction, or at least one subtracter, between said signals. Thus, a reception in differential mode is reproduced to reduce or cancel common mode noise.

Operation means may also make at least one linear combination of the converted signals, for example for limiting the dynamic range of the obtained digital signal, or for reducing noise while recovering the initial differential signal at the output.

Finally, operation means may also make at least one equalization of the converted signals, to compensate for attenuation effects while reducing noise. This equalization consists of a linear combination of the converted signals, delay elements being associated with each signal.

The analog-digital conversion means, or the analog-digital converter, may be asynchronous, so that sampling is not done at this level in the reception chain.

The analog-digital conversion means, or the analog-digital converter, may comprise at least one comparator when the conversion is done on 1 bit.

The input interface may comprise at least one antenna.

The input interface may comprise at least one antenna for each channel.

The input interface may distribute the received signal on each channel.

The input interface may comprise at least one low noise differential amplifier comprising at least two differential inputs, the first being connected to the antenna and the second to a zero potential, for example a ground, and at least one output for each channel.

The second differential input may be connected to the zero potential through at least one impedance, for example equal to the equivalent impedance of the antenna.

The input interface may comprise at least one balun transformer comprising a primary connected between the antenna and a zero potential, for example a ground, and a secondary connected to the channels.

In this case, the primary may be connected to the zero potential through at least one impedance, for example equal to the equivalent impedance of the antenna.

The input interface may comprise at least one low noise amplifier.

The digital processing means may comprise filter means, or at least one filter, such as a pass band filter, and/or sampling means or at least one sampler, and/or dynamically adapted filter means or at least one dynamically adapted filter, after the operation means.

The digital processing means may comprise, after the operation means, a communication channel for processing of the transmitted data and a positioning channel to measure a distance separating the reception chain from a received signal transmitter.

The digital processing means may also comprise at least one integrator filter and/or at least one coherent integrations filter and/or demodulation and synchronization means or at least one demodulator and at least one synchronizer, for processing of the transmitted data.

The digital processing means may comprise means of selecting samples of the received signal, or at least one signal received samples selector, and/or at least one coherent integrations filter, to measure a distance separating the reception chain from a received signal transmitter.

When the digital processing means comprise demodulation and synchronization means, or the demodulator and the synchronizer, the sample selection means of the received signal, or the signal received samples selector, may be connected to said demodulation and synchronization means, or said demodulator and synchronizer.

This invention also relates to a method for signals reception including the following steps:
reception of a signal,
transformation of the received signal into at least two signals correlated in phase or in opposite phase,
distribution of each correlated signal on at least one channel,
analog-digital conversion of the correlated signals on at least 1 bit,
production of at least one operation between the digital correlated signals.

The signals reception method may also include a step of amplification of the correlated signals, that may for example be done between the step of distribution of each correlated signal on at least one channel and the step of analog-digital conversion of the correlated signals on at least 1 bit.

The amplification of the correlated signals may be a linear or non-linear amplification, such as amplification with saturation and/or with constant gain.

The signals reception method according to this invention may include at least one additional low noise amplification step on at least one of the channels before the step of amplification of the correlated signals.

The operation between the digital correlated signals may include at least one multiplication, at least one addition when said signals are in phase, at least one subtraction between said signals when said correlated signals are in opposite phase, at least one linear combination or at least one signals equalization.

The signals reception method may include at least one filtering step, for example a pass band filtering, and/or at least one sampling step, and/or at least one dynamically adapted filtering step, after the operation step between the correlated signals.

The signals reception method may also include at least one step to distribute the multiplied signal over at least one communication channel and at least one positioning channel, after the operation step between the correlated signals.

The analog-digital conversion may be asynchronous.

For processing of transmitted data, the signals reception method may include at least one integration step of the multiplied signal, and/or at least one coherent integrations step, and/or at least one demodulation and synchronization step.

Finally, to measure a distance separating the reception chain using said reception method from a received signal transmitter, said signals reception method may include at least one step to select samples of the received signal, and/or at least one coherent integrations step.

BRIEF DESCRIPTION OF THE DRAWINGS

This invention will be better understood after reading the description of example embodiments given purely for guidance and in no way limitatively, with reference to the appended drawings, wherein.

DETAILED DESCRIPTION OF PARTICULAR EMBODIMENTS

The invention is a reception chain based mainly on detection of energy from the received signal. It is based on the use and processing of two (or more) correlated signals (that can be in phase or in opposite phase) representing the received signal. These two signals are transported on two identical channels. The invention is distinguished from Multiple Input Multiple Output (MIMO) antenna systems by greater correlation of the input signals. The invention is also distinguished from classical differential systems in which the two signals used are always in opposite phase, the transported and used information being the difference between the two channels. Finally, the invention is distinguished from receivers with signals in quadrature (i/q receiver) because there is no phase shift between the signals on the different channels other than a possible opposite phase.

This invention also relates to a signals reception method. This method may for example be used by the reception chain according to this invention. This method will be described implicitly in the description of the reception chain, which is also the purpose of this invention.

Figure 1:
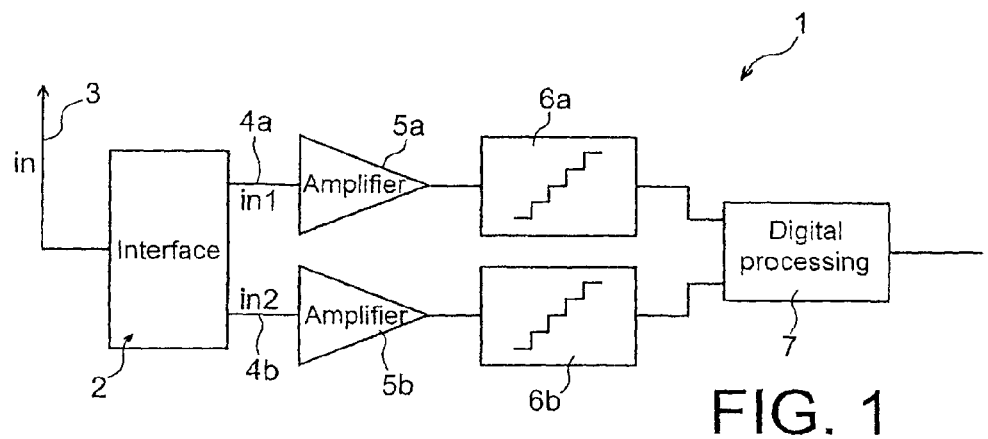
FIG. 1 shows an example of a principle diagram for the reception chain according to this invention, FIG. 2 graphically shows a UWB signal, a noisy UWB signal and the instantaneous power of a signal at the output from the reception chain according to the invention.

Firstly, refer to FIG. 1 that shows an example block diagram for the reception chain 1 according to this invention. This reception chain 1 comprises an input interface 2 for reception of a signal for example through an antenna 3, and transformation of the received signal, in this case into two correlated signals. Each of the correlated signals is distributed on one channel 4a, 4b. The reception chain 1 also comprises amplification means 5a, 5b and analog-digital conversion means 6a, 6b. The reception chain 1 may also not include these amplification means 5a, 5b. The conversion of each correlated signal may be done on 1 or more bits. The conversion may be asynchronous, so that sampling is not done at this level in the reception chain 1. Finally, the reception chain 1 comprises means 7 for digital processing of the converted signals comprising at least means 8 of performing operations, also called operations means, between said converted signals, shown in FIGS. 7 and 8.

In the reception chain 1 in FIG. 1, the analog part is limited to the input interface 2 and the amplification means 5a, 5b. Thus, by performing a large number of functions digitally in the reception chain 1, the consumption of the reception chain 1 is considerably reduced.

In this example in FIG. 1, a signal "in" is received by the antenna 3. This signal is then transformed into two correlated signals by the input interface 2: "in1" and "in2". When in1 and in2 are in phase, we have:

$$in=in1=in2$$

When in1 and in2 are in opposite phase, we have:

$$in=in1=-(in2) \text{ or } in=in2=-(in1)$$

The amplification means, in these case gain cells 5a, 5b, are used to amplify these two signals. The amplification done may be non-linear (for example with saturation), thus enabling the reception chain 1 to not control the amplification gain. The cells 5a, 5b bring the two signals in1 and in2 into the operating dynamic range of the next stage, in other words analog-digital conversion. This analog-digital conversion may be done on 1 or several bits.

Finally, at the end of the chain, digital processing means 7, for example a DSP (Digital Signal Processor), process or demodulate the received information. An example of simple digital processing is digital multiplication of channels in1 and in2 to obtain the signal energy. The product of the channels in1 and in2 gives the following results:

$$in1*in2=in^2$$

The square of the received signal "in" represents its instantaneous power. The integral of this instantaneous power represents the energy of the signal.

The use of several channels 4a, 4b for amplification and digital conversion can reduce the contribution of noise from the electronics in the result obtained (by a factor of $\sqrt{2}$ in the case of two channels) and eliminate a continuous bias on the value of the power. In a single channel reception chain, a noise N (Gaussian noise with standard deviation $\sigma$) is introduced onto the channel by the electronics of the chain. The signal "in" and the noise N are then on the channel. When the signal is multiplied by itself, the result is:

$$in^2+2\cdot in\cdot N+N^2$$

When two channels are used, in1+N1 are obtained on the first channel 4a and in2+N2 on the second channel 4b (where N1 and N2 are Gaussian noises). When the product of the two signals is calculated, the result is:

$$in^2+in\cdot(N1+N2)+N1\cdot N2$$

The two channels 4a, 4b are distinct electronic parts, therefore noise N1 and noise N2 are not correlated even if they have the same standard deviation $\sigma$. The term in·(N1+N2) then becomes equal to $\sqrt{2}\cdot in\cdot N$, which is $\sqrt{2}$ smaller than the result obtained with a single channel reception chain. Furthermore, in the case of two channels, the term N1.N2 may become equal to noise with standard deviation $\sigma^2$, while in the case of a single channel it can be demonstrated that the term $N^2$ is formed from a non-zero mean (an unfavorable bias), and a variable part for which the standard deviation is equal to $\sqrt{2}\cdot\sigma^2$. This result is comparable to the result obtained by classical differential structures, but in this invention the signals are not necessarily in opposite phase.

Furthermore, it is not possible to achieve energy detection on a single channel by taking the product of digital data that will be on 1 bit only. This is possible with at least two channels due to the use of noise, which cannot be done by classical differential structures.

Figure 8:
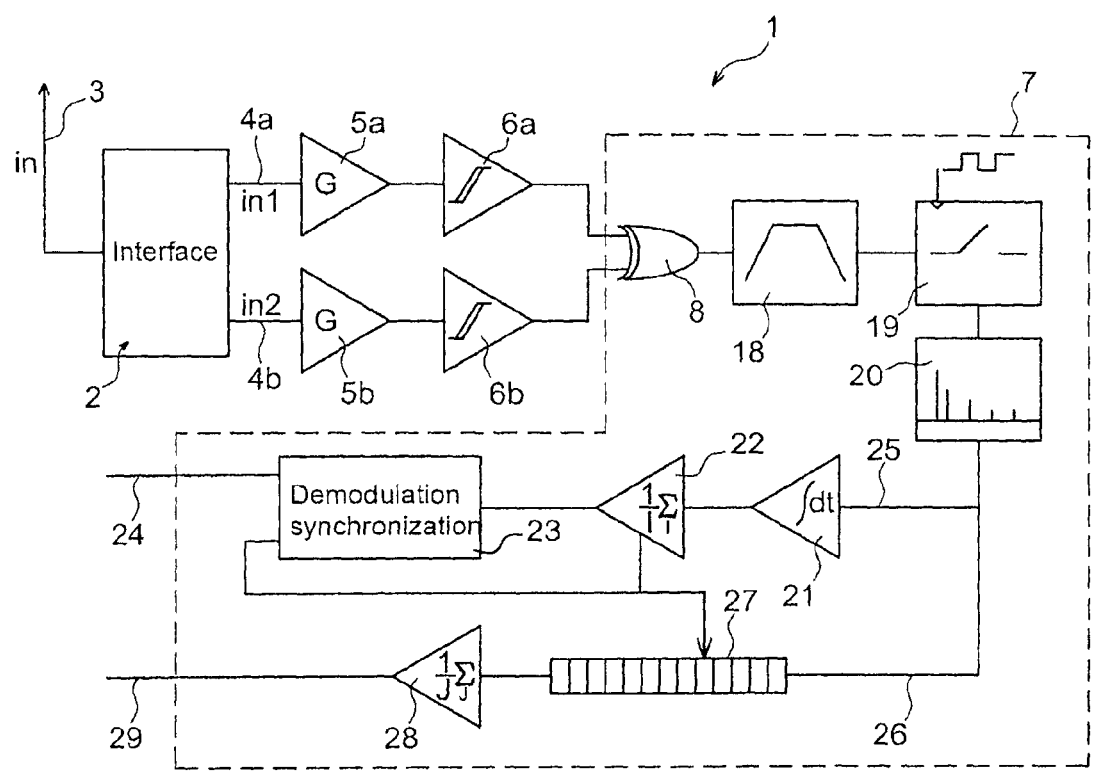
FIG. 8 shows a reception chain according to a second embodiment of this invention.

The main advantage of the invention is in its simplicity. This is particularly true when the number of channels is limited to two and the analog-digital conversion 6a, 6b is done on a single bit by a single asynchronous comparator per channel, as shown in FIG. 8. In this case, the digital processing 7 consisting of taking the product of the channels may become a simple exclusive OR gate if the signals are in opposite phase, or an exclusive NOR gate if the signals are in phase. Furthermore, in the case of a single bit conversion 6a, 6b, the amplification 5a, 5b at the input to the reception chain 1, only needs a constant gain simply defined by the hysteresis of the comparator (the smallest detectable signal).

Another advantage of the invention is the noise contribution of the reception chain 1 that is smaller than a chain that only uses a single channel. Due to simplification particularly of the analog part, the presence of the second channel only introduces a modest increase in consumption compared with the whole of the chain.

Figure 2:
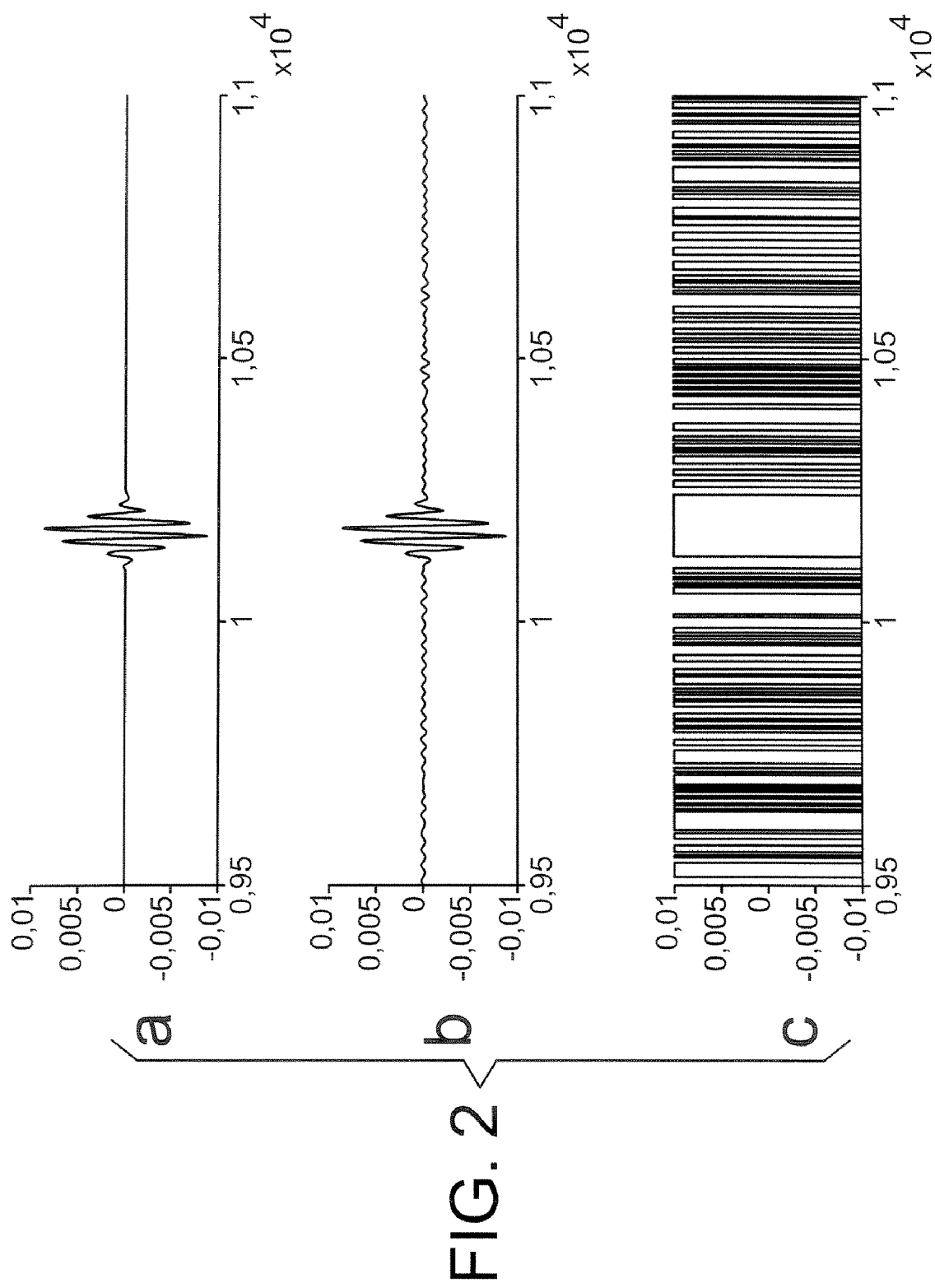

FIG. 2 shows a pulsed UWB signal a) and a pulsed UWB signal b) to which noise on a channel of the reception chain 1 is added. In accordance with what has been described above, signal a) represents the signal "in" and signal b) represents the signal in+N·Signal c) is the output from an exclusive NOR with a signal in1=in+N1 on its first input, and a signal in2=in+N2 on its second input. The signal c) is actually the product of these two signals, therefore the instantaneous power in1*in2. It can be seen with the signal c) that the instantaneous output power consists of noise when the signal is missing, and a logical level 1 during a pulse on signal b). If the noise was absent, the output would always be equal to <<1>> because the signals from the two channels would be identical in phase or in opposite phase.

It is also possible that the digital processing means 7 do not do a multiplication, and instead do an addition of the channels when the signals are in phase. This addition operation reduces the noise without modifying the initially received signal "in". If n channels are used, and if the digitized signal on channel i is denoted $V_i(t)$, we obtain the signal:

$$S(t) = \sum_{i=1}^{n} V_i(t)$$

The noise is then reduced by a factor $\sqrt{n}$.

When the received signal is distributed, for example on two channels and the signals are in opposite phase, it is also possible to subtract these two channels such that:

$$S(t) = V_1(t) - V_2(t)$$

This operation is used to reproduce reception in differential mode, in other words to calculate the initial differential signal between two channels. In reproducing this reception type, common mode noise, in other words any parasite signal present on each of the channels in phase, is reduced or cancelled out.

It is also possible to make a linear combination of the channels such as:

$$S(t) = \sum_{i=1}^{n} a_i \cdot V_i(t)$$

where $a_i$ are the coefficients of the linear combination.

This operation is a generalization of addition and subtraction operations that are completed by a multiplication coefficient that may be different for each channel. For example, it may be useful to divide the addition of n channels by a factor n, to limit the dynamic range of the digital signal. It may also be interesting to make the following linear combination, when there are 2n channels with n channels $V_i$ transporting the signal in phase and n channels $V_j$ transporting the signal in opposite phase $$S(t) = \sum_{i=1}^{n} \cdot V_i(t) + \sum_{j=1}^{n} \cdot (-1) \cdot V_j(t)$$

Thus, n channels $V_i$ and n channels $V_j$ are added to reduce noise, and the two sums are then subtracted as in differential mode to obtain the initial differential signal.

A channels equalization operation can also be done such that:

$$S(t) = \sum_{i=1}^{n} a_i \cdot V_i(t + \tau_i)$$

where $a_i$ are the linear combination coefficients and $\tau_i$ are delay elements associated with each channel.

This operation is usually used on a single channel so as to compensate for the very harmful attenuation effects in radio wave propagation. In this case, this operation is generalized to n channels because the noise from each of the channels remains uncorrelated with noise from other channels in the long term. In this case, different delays are associated with each of the channels and then a linear combination is made between the channels. Once again, the noise present is reduced.

We will now describe the different possible input interfaces 2 of the reception chain I according to this invention.

Figure 3:
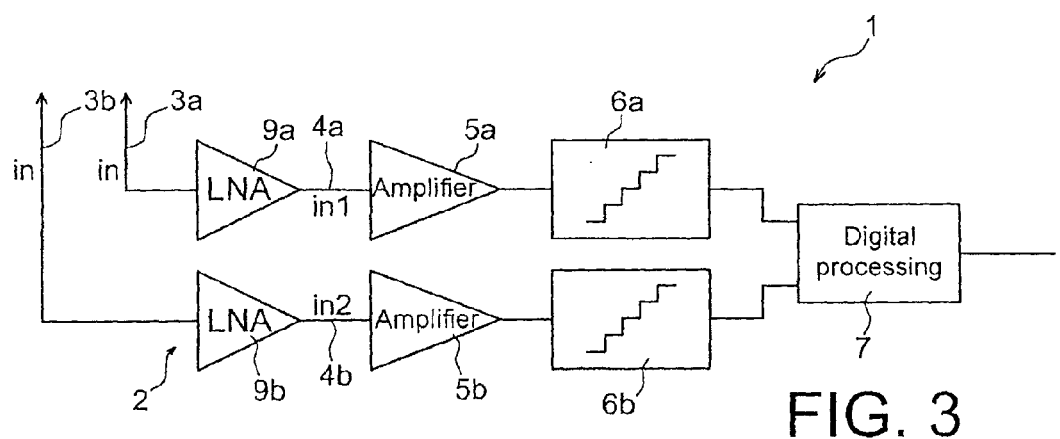
FIG. 3 shows a reception chain according to this invention, comprising a first example input interface.

FIG. 3 shows a reception chain according to this invention, comprising a first example input interface 2. The reception chain 1 in FIG. 3 is a chain with two channels 4a, 4b. In this case, it is an interface by duplication of the antenna. In this solution, the signal is collected by two identical antennas 3a, 3b. It is thus assumed that the input signals of the two channels 4a, 4b are sufficiently close to each other to be considered to be equal in phase. Therefore the reception chain 1 is considered to be non-differential in this case. This input interface 2 also comprises two low noise amplifiers 9a, 9b, each arranged on a channel 4a, 4b back along of the amplifiers 5a and 5b.

The advantages of this embodiment lie in the simplicity of the input interface 2. The low noise amplifiers 9a, 9b are conventional and are each adapted to one antenna 3a, 3b, for example with an impedance of 50 Ohms. Each channel 4a, 4b has its own antenna 3a, 3b, therefore this solution introduces a gain in the signal power by a factor of two compared with a single antenna solution. Furthermore, there is no common mode noise (correlated noise associated with the input to each channel), but only channel noise (in other words uncorrelated noises from each channel) possibly comprising an uncorrelated part collected by the antennas and common noise (noise associated with the collected signal) output from the propagation channel and couplings internal to the circuit.

The production of the pair of antennas is perfectly matched. Thus, the two collected signals are identical in amplitude and especially in phase regardless of the orientation of the antennas. In this example input interface 2, common noise output from couplings internal to the circuit is not rejected.

Figure 4:
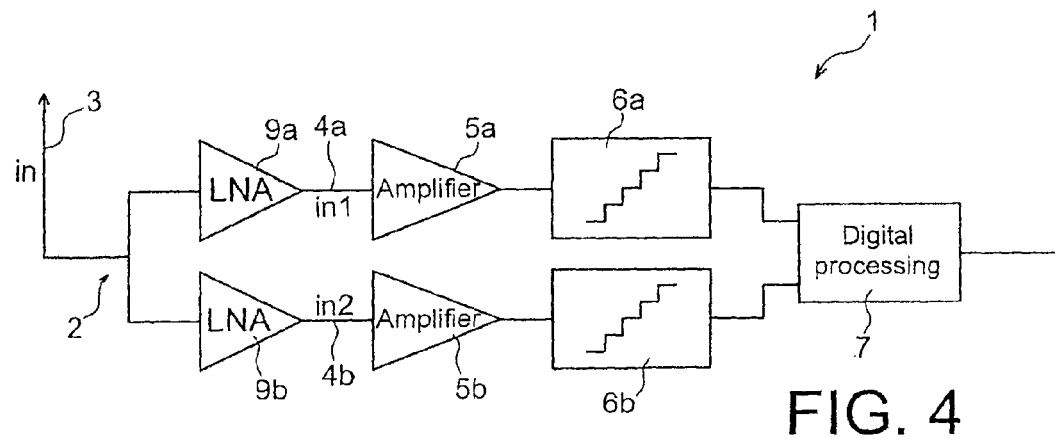
FIG. 4 shows a reception chain according to this invention, comprising a second example input interface.

FIG. 4 shows a reception chain 1 according to this invention, comprising a second example input interface 2. In this case, it is an interface by duplication of the input signal. The reception chain 1 in FIG. 4 is a chain with two channels 4a, 4b. In this solution, the signal is collected by a single antenna 3 but is directly input to two low noise amplifiers 9a, 9b, each on one of the two channels 4a, 4b. These amplifiers 9a, 9b are separated from each other but are associated, in other words they have an input impedance matched to the antenna 3. For example, if the impedance of the antenna 3 is 50 Ohms, each amplifier 9a, 9b has an impedance of 100 Ohms. The input signals of the two channels 4a, 4b are inherently identical because they originate from the same antenna 3.

The advantages of this solution are the simplicity of the electronics and lack of common mode noise. But the power of the signal is lowered by a factor of two, because the signal is distributed on two channels. Compared with the double antenna solution 3a, 3b shown in FIG. 3, the loss is a factor of four, but this loss may be compensated by a judicious design of the low noise amplifiers 9a, 9b (input impedance, voltage mode rather than power mode, etc.). As for the double antenna 3a, 3b, common noise output from couplings internal to the circuit is not rejected.

Figure 5:
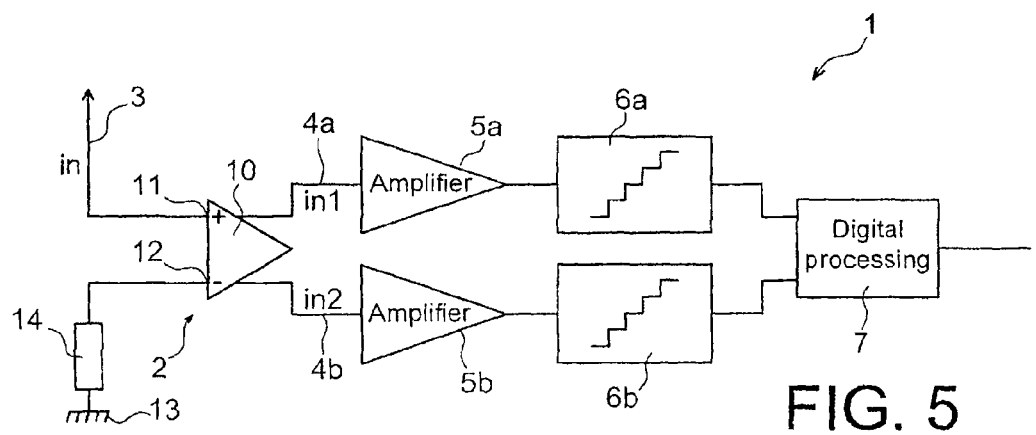
FIG. 5 shows a reception chain according to this invention, comprising a third example input interface.

FIG. 5 shows a reception chain 1 according to this invention comprising a third example input interface 2. This is a differential interface for each amplifier. The reception chain 1 in FIG. 5 is a chain with two channels 4a, 4b. In this solution, the operating mode is pseudo-differential in that the input signals of the channels 4a, 4b are in opposite phase. Consequently a low noise differential amplifier 10 is used. The low noise differential amplifier 10 comprises a positive input 11 and a negative input 12. The antenna 3 is connected to the positive input 11 while a zero potential, for example a ground 13, is connected to the negative input 12. This solution, with a single antenna 3, can be used to obtain an operating mode rejecting the major part of the common mode noise, particularly if the ground 13 is connected to the negative input 12 of the differential amplifier 10 through an impedance 14 that reproduces the equivalent impedance of the antenna 3. This third example input interface 2 is more complex than the first two examples, due to the differential structure of the low noise amplifier 10, and has common mode noise output from the electronics of the low noise amplifier 10. This noise is only partly rejected during calculation of the energy.

Figure 6:
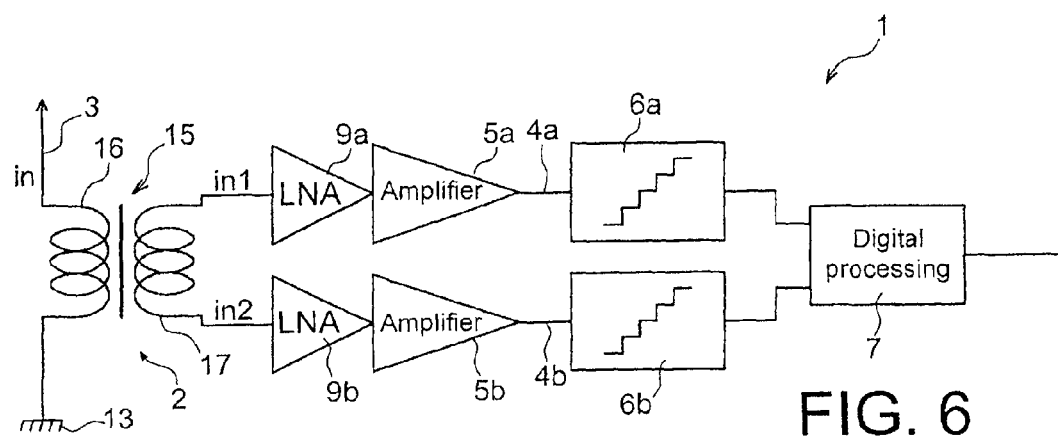
FIG. 6 shows a reception chain according to this invention, comprising a fourth example input interface.

FIG. 6 shows a reception chain 1 according to this invention comprising a fourth example input interface 2. This is a differential interface using a balun transformer. The reception chain 1 in FIG. 6 is a chain with two channels 4a, 4b. In this solution, as in the third example input interface 2 in FIG. 5, the operating mode is pseudo-differential in that the input signals of the channels 4a, 4b are in opposite phase. The change to differential is made by a balun transformer 15 that is preferably integrated into the circuit if there are low losses. The primary 16 of the balun 15 is connected between the antenna 3 and the ground 13 while the secondary 17 outputs two signals in opposite phase.

Once again, a single antenna 3 is necessary and its operating mode rejects most common mode noise, particularly if the ground 13 is connected to the primary 16 of the balun 15 through an impedance 14 that reproduces the equivalent impedance of the antenna as shown in FIG. 5. This solution also enables operation of amplifiers 9a, 9b in voltage mode by modifying the ratio of the number of turns in the balun between the primary 16 and the secondary 17. The amplifiers 9a, 9b change to voltage mode when their input impedances become greater than the characteristic impedance (for example 50 Ohms). An amplifier with a low parasite capacity as an input impedance operates in voltage mode. This is the case for classical amplifiers using a CMOS technology. Thus, a high impedance at the input of amplifiers 9a, 9b can be seen through the balun 15 as being an impedance adapted to the antenna (for example 50 Ohms). There is no need for the low noise amplifiers 9a, 9b to be differential. Since the balun is a passive element, this solution does not produce any common mode noise. This embodiment is more complex than the previous embodiments and a loss of the received signal can occur due to losses in the balun 15, particularly if the balun is integrated into the circuit.

Figure 7:
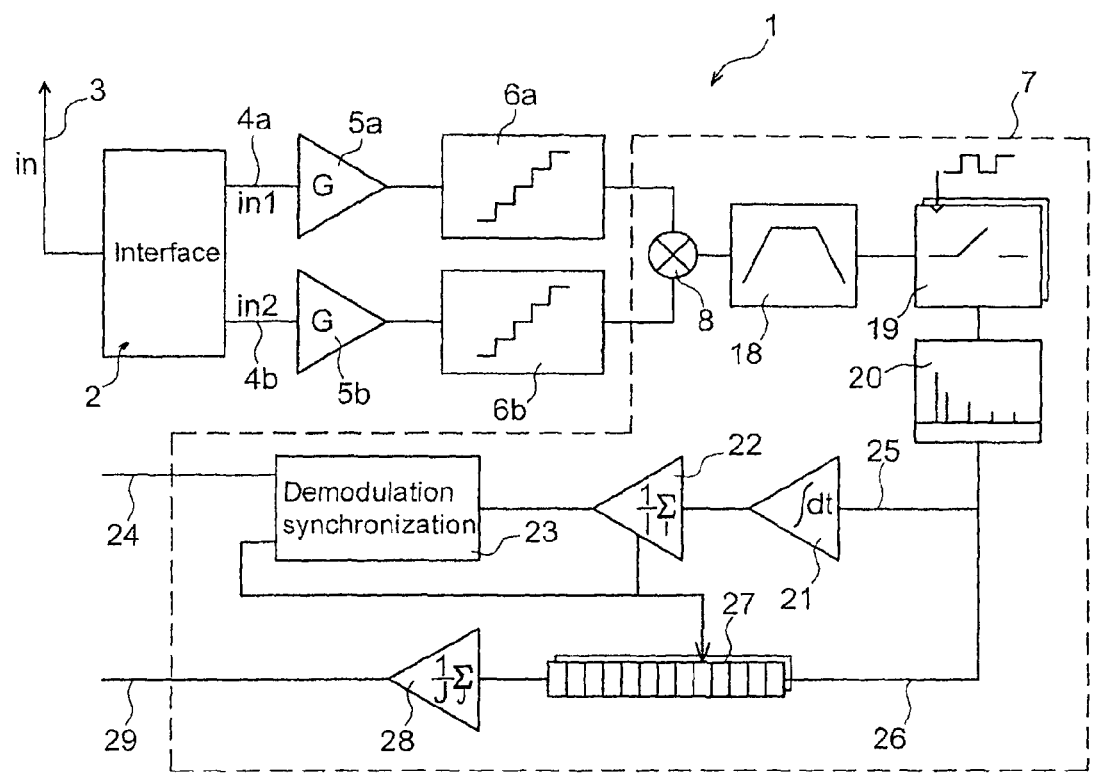
FIG. 7 shows a reception chain according to a first embodiment of this invention.

Now refer to FIG. 7 that represents a first embodiment of a signals reception chain 1 according to this invention. In this case as in FIG. 1, the reception chain 1 comprises an input interface 2 that may be like that shown in FIGS. 3 to 6, with an amplifier 5a, 5b for example with constant gain, on each of the two channels 4a, 4b, and an N-bit converter 6a, 6b on each channel 4a, 4b.

Digital processing means 7 may for example comprise a multiplier 8 multiplying the digitally converted signals, outputting the instantaneous power of the received signal called the instantaneous power signal. In this case, the digital processing means 7 also comprise elements additional to the multiplier 8; the reception chain 1 in FIG. 7 provides transmitted data and also a measurement of the arrival time of the data coding pulses. The properties of pulsed UWB transmissions make it possible to determine the propagation time between the transmitters and the receivers and therefore to measure the distance separating them with good precision (about a few tens of centimeters). The reception chain 1 in FIG. 7 is used to make this pulses arrival time measurement.

After the asynchronous analog-digital conversion 6a, 6b, the product of the channels 4a, 4b gives the instantaneous power of the signal. Its spectrum is then in low frequencies compared with the received signal, on a bandwidth equal to half the width of the initial band.

A pass band filter 18 is used to delete the part of the spectrum close to the sampling frequency, in other words to cut off frequencies of the instantaneous power signal that are beyond half the sampling frequency so as to respect the Shannon criterion. For example, a typical UWB pulse has a bandwidth of 1 GHz centered around of f=4 GHz. After determining the product of channels 4a, 4b, the signal is concentrated on a frequency band between 0 and 500 MHz and on a 500 MHZ band at about 8 GHz. Then using a pass band filter for which the bandwidth of 500 MHz is centered about 250 MHz, only the signal located in the frequency band between O and 500 MHz is kept. The low cut off of the filter can be very close to 0, for example about 1 MHz. It also makes it possible to delete the DC component of the signal that contains a bias output from common noise. This filter 18 may be made either analogically, a second digitization being done after filtering, or digitally using asynchronous logical functions (gates and delays) as shown in FIG. 7 after the multiplier 8.

Sampling 19 is then done after the pass band filtering 18. This sampling 19 is no longer done back along in the reception chain 1 because it can be done at a much lower frequency on the instantaneous power than on the initially received signal. For example, a UWB signal centered on 4 GHz with a bandwidth of 2 GHz will be sampled at least 10 GHz, while its power between 0 and 1 GHz will only be sampled at 2 GHz to respect the Shannon criterion.

After sampling, an optional dynamically adapted filtering 20 is done for the purpose of reducing the noise of the instantaneous power signal. It is effective in difficult environments. These environments have a waves propagation channel in which the initial pulse follows multiple paths, reflections and attenuations. The RF signal collected by the receiver is then no longer formed from a single and strong pulse, but many less powerful and spreaded in time (several tens of nanoseconds) pulses. The transformation of the emitted pulse through the channel into received pulses is called the channel response. For example, this filter may be a Finite Impulse Response (FIR) filter. This filter is characterized by performing a channel learning step, for example taking the average of the previously received channel responses. From this "typical" response, the filter coefficients are determined.

After this filtering 20, the signals follow two channels: one used for communication, in other words reception of transmitted data (channel 25) and the other for positioning of the transmitter with respect to the receiver (channel 26).

Since the communication channel 25 has less need for precision in time than the positioning channel 26, this channel 25 comprises a first filtering step made using an integrator filter 21 with the purpose of calculating the energy of the received signal from the instantaneous power of the received signal. As its name suggests, the filter 21 integrates the signal received at the input. This filter 21 is characterized by its parameter k that represents the reduction factor of the number of samples. k consecutive samples are then summated to form a single sample. The filter 21 reduces the number of samples by k with the purpose of improving consumption performances and reduces noise before demodulation. If D is the dynamic range of input samples, output samples will have a dynamic range equal to k.D. There is an optimum value k that depends on the type of channel on which the integrator filter 21 is used.

A second filter 22 making coherent integrations will in turn reduce noise so that the signal obtained can be correctly demodulated. Coherent integrations represent final filtering of the reception chain 1. They are used when the received signal is weak compared with the noise and that despite the previous filtering, noise remains too high to demodulate the signal or to measure the pulse arrival time. The measurement of time due to the requested precision is usually much more sensitive to noise than the demodulation. Coherent integrations are based on an increase in the signal quantity compared with the noise by repetition of the transmitted pulse rather than by increasing its power. Pulses are repeated (for example R times) at the rate of the Pulse Repetition Period (PRP) and the receiver will have to take the sum of R signals received over the depth of the PRP, sample by sample. Sums are made in synchronization with the PRP and supply a pulse response the same length as the PRP. Since noise is a priori not correlated between two pulses, coherent integrations are used to reduce it by a factor of $\sqrt{R}$. The stability of time bases between the transmitter and the receiver throughout the R repetitions is the condition for this filtering to be efficient. It is the coherence aspect of integration. If pulses are made for example with a width of 1 ns and the time bases drift by 1 ns from each other between two emissions, each pulse is then in the noise of the other pulse. The sum of the two signals received with this shift can then no longer increase the signal to noise ratio. The necessary relative precision of the time bases between the transmitter and the receiver may be of the order of a few parts per million (ppm). A relative drift compensation mechanism may then be necessary.

Finally, the last step in the reception chain 1 to obtain transmitted data consists of doing a signal demodulation and synchronization 23.

Possible modulations starting from the energy measurement are OOK (On Off Keying) and PPM (Pulse Position Modulation). The OOK modulation consists of sending a pulse on a logical level of the data to be transmitted and to send nothing on the other logical level. The demodulator must just detect the presence or absence of pulses to rebuild the data. In the case of the PPM modulation, the pulse repetition period (PRP) is cut into time slices. A pulse is sent in one of the time slices of one PRP as a function of digital values to be transmitted. For the PPM, the demodulator must also cut the PRP into slices and detect the slice in which the pulse is located.

Regardless of which modulation is chosen, the demodulation is in synchronization with the PRP of emitted pulses so as to detect the presence of pulses in the expected time lags. Synchronization is done at regular intervals by sending predetermined sequences of pulses that the receiver can easily recognize and decode. The repetition of synchronization sequences depends on the time that the system can lose before synchronizing itself. The communication data transmitted to the reception chain 1 are then located at the output 24 from the demodulation and synchronization means 23.

The channel 26 for positioning needs the maximum possible time precision so as to achieve the best possible positioning precision. The pulse arrival time may be measured on the instantaneous power signal sampled at the same frequency as on the communication channel 25. Since synchronization was already established, selection means 27 only select consecutive samples that probably contain the signal. The means 27 then search for the first propagated pulse corresponding to the shortest transmission path. Samples are counted from synchronization on the PRP until the first signal is used to provide a relative time as a number of clock periods. This measurement is based on the precision of the previous synchronization and the precision of the sampling period of the instantaneous power signal. In FIG. 7, a filter 28 making coherent integrations similar to the filter 22 in channel 25 of the communication is used in turn to reduce noise down to an acceptable level to detect the sample containing the pulse incident to the first propagated pulse. Therefore the precision is given by the period of the sampling clock located in the sampling means 19. The pulse arrival time is delivered on the output 29.

Since demodulation takes place at the same time as the time measurement, it is possible to sample or to keep only part the signal that probably contains the first propagated pulse. To achieve this, the first step is to consider the sample from which the demodulation was done during previous PRP cycles as a "predictive pointer". Starting from this predictive pointer, a time window of N previous samples is then considered and only these samples are kept for subsequent PRPs.

The synchronization phases may be used to record the channel response in a memory of the receiver not shown. Subsequently, when the objective is to demodulate or to measure the pulse arrival time, the memorized response of the channel may be used by the filter 20 to filter the energy signal due to a convolution. The more the channel response is spread, the more efficient is the filtering. Since the channel remains unchanged between its evaluation and its use, it can be said that this filtering is matched to the channel. Furthermore, if the channel evaluation phases are repeated sufficiently often compared with the modifications that may occur to them (displacements and movements), it can be said that this filtering is dynamic.

FIG. 8 shows a signals reception chain 1 according to this invention, according to a second embodiment. Compared with the reception chain 1 in FIG. 7, the analog-digital conversion is done in this case using asynchronous comparators on 1 bit. In this case the signals are in opposite phase, and a multiplication of the converted signals is then done by a single exclusive OR gate because it is considered that the data on 1 bit represents the sign of the signal. In this second embodiment, the sampling filter also provides one data item on 1 bit, the sampling means 19 can be done by a simple D flip-flop.

Figure 9:
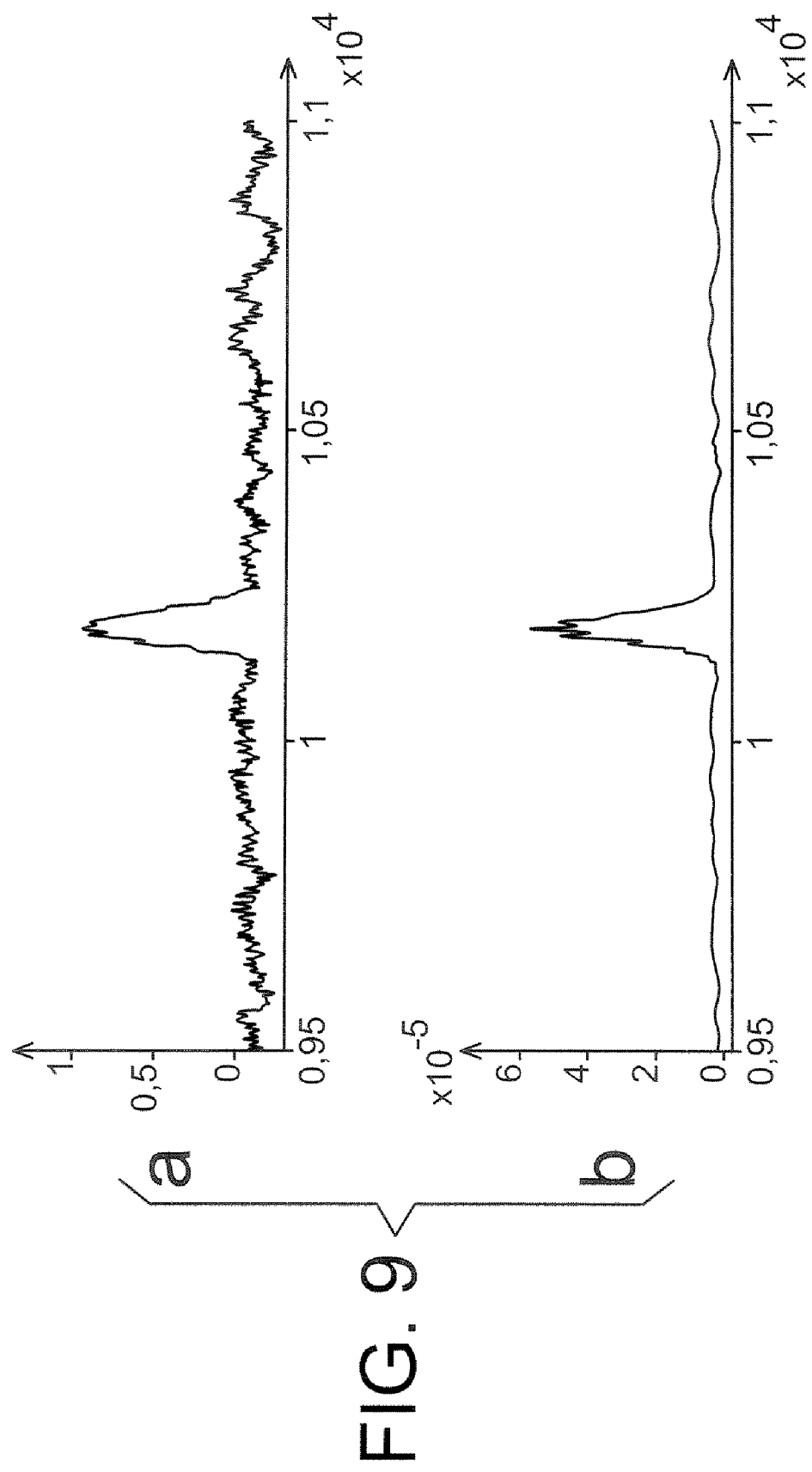
FIG. 9 shows an instantaneous power signal after filtering, digitized on 1 bit, and an instantaneous power signal after filtering, digitized on several bits.

Choosing a conversion of signals on 1 bit simplifies the design of the reception chain 1. However a conversion on 1 bit means louder noise on the filtered signal compared with a signal digitally converted on several bits. FIG. 9 graphically shows the signal at the output from the filter 18. The signal a) represents a converted signal on 1 bit and signal b) represents a converted signal on several bits. It can be seen that for equal filtering, there is more noise on the filtered signal when it is digitized on 1 bit than there is on a filtered signal when it is digitized on several bits. For example in a chain with N bits, where N tends towards infinity, the noise is 6 dB lower than noise present in a single-bit chain.

In these two example embodiments shown in FIGS. 7 and 8, only two channels 4a, 4b are used. More than two channels can also be used. The performances are then improved in the case in which more than two channels are used, but the consumption of the receiver is higher. By extrapolating to N channels, the improvement in noise approximately follows a square root of N law. It is then necessary to choose a good balance between the improvement in noise resulting from an increase in the number of channels and the increase in the complexity and the resulting consumption.

This invention can be used in all applications concerning short-range wireless communications (a few tens of meters) of the UWB type. It may advantageously replace the analog part of existing receivers that use energy from the pulses. However, it is quite possible to recover other characteristics of signals to the extent that these magnitudes may be deduced from the combination of signals output from at least two independent amplification channels. The chain can also be used in the case of narrower band signals.

The invention is also widely used for the measurement of distance, positioning and even displacement (velocity measurement) of a transmitter-receiver. Low consumption properties must be such that battery powered portable devices can be made. There can then be a very wide range of applications in fields such as telemetry or monitoring of movements of person and property in premises or transports.

The invention claimed is:

1. A signals reception chain comprising:
an input interface receiving a signal and transforming the received signal into at least two signals correlated in phase or in opposite phase, each of the correlated signals being distributed on at least one channel,
an analog-digital converter, on each of the channels, that operates on 1 bit of a respective one of the correlated signals, wherein signals operated on by all analog-digital converts are in phase or in opposite phase, and
a digital processor that processes signals from all of the analog-digital converters, wherein all the signals received from each of the analog-digital converts are in phase or in opposite phase, and said digital processor includes at least means for performing operations between said signals from each of the analog-digital converts,
wherein the channels are identical from the input interface to the digital processor and include distinct electronic parts introducing uncorrelated noises onto each channel, and
the means for performing operations includes at least one multiplier, or at least one adder when said signals received from each of the analog-digital converts are in phase, or at least one subtracter when said signals received from each of the analog-digital converts are in opposite phase, or said means for performing operations makes at least one linear combination or at least one equalization of said signals received from each of the analog-digital converts.

2. The signals reception chain of claim 1, further comprising at least one amplifier.

3. The signals reception chain of claim 2, wherein the amplifier is arranged between the input interface and the analog-digital converter.

4. The signals reception chain of claim 2, wherein the amplifier makes a linear amplification, a non-linear amplification, or an amplification with saturation.

5. The signals reception chain of claim 2, wherein the amplifier has a constant gain.

6. The signals reception chain of claim 1, wherein the multiplier includes at least one exclusive OR gate when the received signal is transformed into two correlated signals.

7. The signals reception chain of claim 6, wherein an output from the exclusive OR gate of the multiplier is an inverter output when the two correlated signals are in phase.

8. The signals reception chain of claim 1, wherein the analog-digital converter is asynchronous.

9. The signals reception chain of claim 1, wherein the analog-digital converter includes at least one comparator.

10. The signals reception chain of claim 1, wherein the input interface includes at least one antenna.

11. The signals reception chain of claim 1, wherein the input interface includes at least one antenna for each channel.

12. The signals reception chain of claim 1, wherein the input interface distributes the received signal on each channel.

13. The signals reception chain of claim 10, wherein the input interface includes at least one low noise differential amplifier including at least two differential inputs, the first being connected to the antenna and the second to a zero potential or a ground, and at least one output for each channel.

14. The signals reception chain of claim 13, wherein the second differential input is connected to the zero potential through at least one impedance.

15. The signals reception chain of claim 10, wherein the input interface includes at least one balun transformer including a primary winding connected between the antenna and a zero potential or a ground, and a secondary winding connected to the channels.

16. The signals reception chain of claim 15, wherein the primary winding is connected to the zero potential through at least one impedance.

17. The signals reception chain of any one of claim 14 or 16, wherein the impedance is equal to an equivalent impedance of the antenna.

18. The signals reception chain of claim 1, wherein the input interface includes at least one low noise amplifier.

19. The signals reception chain of claim 1, wherein the digital processor includes at least one filter or a pass band filter, and/or at least one sampler, and/or at least one dynamically adapted filter, after the means for performing operations.

20. The signals reception chain of claim 1, wherein the digital processor includes, after the means for performing operations, a communication channel for processing of the transmitted data and a positioning channel to measure a distance separating the reception chain from a received signal transmitter.

21. The signals reception chain of claim 1, wherein the digital processor includes, at least one integrator filter, and/or at least one coherent integrations filter, and/or at least one demodulator and at least one synchronizer, for processing of transmitted data.

22. The signals reception chain of claim 1, wherein the digital processor includes at least one signal received samples selector and/or at least one coherent integrations filter, to measure a distance separating the reception chain from a received signal transmitter.

23. The signals reception chain of claim 21, wherein the digital processor includes at least one signal received samples selector and/or at least one coherent integrations filter, to measure a distance separating the reception chain from a received signal transmitter.

24. The signals reception chain of claim 23, wherein, when the digital processor includes the demodulator and the synchronizer, the signal received samples selector is connected to said demodulator and synchronizer.

25. The signals reception chain of claim 1, wherein the means for performing operations includes means for detecting an energy of the received signal.

26. A method for signals reception comprising:
receiving a signal with an input interface,
transforming the received signal into at least two signals correlated in phase or in opposite phase,
distributing each correlated signal on at least one channel,
analog-digital converting the correlated signals with an analog-digital converter on each channel that operates on 1 bit of a respective one of the correlated signals, wherein signals operated on by all analog-digital converters are in phase or in opposite phase,
processing, with a digital processor, signals from all of the analog-digital converters, wherein all the signals received by the digital processor from each of the analog-digital converters are in phase or in opposite phase, and
producing at least one operation between the signals received by the digital processor from the analog-digital converters,
wherein the channels are identical from the input interface to the digital processor and include distinct electronic parts introducing uncorrelated noises onto each channel, and
the operation includes at least one multiplication, or at least one addition when said signals received by the digital processor from the analog-digital converters are in phase, or at least one subtraction when said signals received by the digital processor from the analog-digital converters are in opposite phase, or at least one linear combination or at least one equalization of said signals received by the digital processor from the analog-digital converters.

27. The signals reception method of claim 26, further comprising amplifying the correlated signals.

28. The signals reception method of claim 27, wherein the amplyfing is performed between the distributing and the analog-digital converting.

29. The signals reception method of claim 27, wherein the amplifying includes using a linear amplification, a non-linear amplification, or an amplification with saturation and/or with constant gain.

30. The signals reception method of claim 27, further comprising, before the amplifying of the correlated signals, low noise amplifying at least one of the channels.

31. The signals reception method of claim 26, further comprising implementing a filtering or pass band filtering, and/or implement a sampling, and/or implementing at least one dynamically adapted filtering, after the operation between the correlated signals.

32. The signals reception method of claim 26, further comprising distributing the signal obtained over at least one communication channel and at least one positioning channel, after the operation between the correlated signals.

33. The signals reception method of claim 26, wherein the analog-digital converting includes an asynchronous conversion.

34. The signals reception method of claim 26, further comprising integrating the multiplied signal, and/or implementing at least one coherent integration, and/or implementing at least one demodulation and synchronization, for processing transmitted data.

35. The signals reception method of claim 26, further comprising selecting samples of the received signal, and/or implementing at least one coherent integration to measure a distance separating a reception chain from a received signal transmitter.

* * * * *